(12) United States Patent
Kawasaki et al.

(10) Patent No.: US 7,309,743 B2
(45) Date of Patent: Dec. 18, 2007

(54) FLUORINE-CONTAINING ELASTOMER AND COMPOSITION THEREOF FOR CROSSLINKING

(75) Inventors: Kazuyoshi Kawasaki, Settsu (JP); Masaki Irie, Settsu (JP); Katsuhiko Iseki, Tsuchiura (JP); Tsuyoshi Itagaki, Tsukuba (JP); Tsuyoshi Noguchi, Settsu (JP); Takafumi Yamato, Settsu (JP); Mitsuru Kishine, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 203 days.

(21) Appl. No.: 10/726,604

(22) Filed: Dec. 4, 2003

(65) Prior Publication Data

US 2004/0122182 A1 Jun. 24, 2004

Related U.S. Application Data

(62) Division of application No. 09/831,509, filed as application No. PCT/JP99/06243 on Nov. 10, 1999, now abandoned.

(30) Foreign Application Priority Data

Nov. 13, 1998 (JP) .................................. 10-323924
Dec. 17, 1998 (JP) .................................. 10-359449
Apr. 5, 1999 (JP) .................................. 11-98051

(51) Int. Cl.
*C08L 27/12* (2006.01)
*C08F 8/00* (2006.01)

(52) U.S. Cl. ................ 525/326.2; 525/326.3; 525/326.4; 525/480

(58) Field of Classification Search ............ 525/326.2, 525/326.3, 326.4, 480
See application file for complete search history.

(56) References Cited

U.S. PATENT DOCUMENTS

| | | | | |
|---|---|---|---|---|
| 3,674,758 A | * | 7/1972 | Carlson | ............ 525/326.2 |
| 4,525,539 A | | 6/1985 | Feiring | |
| 4,743,658 A | | 5/1988 | Imbalzano et al. | |
| 5,180,803 A | * | 1/1993 | Gibbard | ............ 528/488 |
| 5,677,389 A | * | 10/1997 | Logothetis et al. | ......... 525/340 |
| 5,726,214 A | * | 3/1998 | Buckmaster et al. | ........ 521/145 |
| 5,777,174 A | | 7/1998 | Marchionni et al. | |
| 5,789,489 A | | 8/1998 | Coughlin et al. | |
| 5,824,749 A | * | 10/1998 | Sonoi et al. | ................ 525/351 |
| 5,877,264 A | * | 3/1999 | Logothetis et al. | ........... 526/86 |
| 6,174,928 B1 | | 1/2001 | Mizuide et al. | |
| 6,777,501 B1 | | 8/2004 | Hiraga et al. | |
| 2002/0013419 A1 | | 1/2002 | Blong et al. | |

FOREIGN PATENT DOCUMENTS

| | | |
|---|---|---|
| EP | 0 226 668 A1 | 7/1987 |
| EP | 0 556 771 A1 | 8/1993 |
| EP | 0 606 883 A1 | 7/1994 |
| EP | 0 708 084 A1 | 4/1996 |
| EP | 0 708 140 A1 | 4/1996 |
| EP | 0 727 413 A1 | 8/1996 |
| EP | 0 863 941 | 9/1998 |
| JP | 38-8591 | 2/1960 |
| JP | 59-109546 | 6/1984 |
| JP | 63-86742 | 4/1988 |
| JP | 04100846 A * | 4/1992 |
| JP | 6-263952 | 9/1994 |
| JP | 8-104789 | 4/1996 |
| JP | 8-120146 | 5/1996 |
| JP | 11-322842 | 11/1999 |
| WO | WO 97/19982 | 6/1997 |
| WO | WO 98/23653 | 6/1998 |
| WO | WO 98/23654 | 6/1998 |
| WO | WO 98/23655 | 6/1998 |
| WO | WO 99/46307 | 9/1999 |

OTHER PUBLICATIONS

Anestis L. Logothetis, "Chemistry of Fluorocarbon Elastomers", *Prog. Polym. Sci.*, vol. 14, pp. 251, 286-289, 1989.
"Hawley's Condensed Chemical Dictionary", 12th ed., Lewis, Sr., ed. Van Nostrund Renhold Co., New York, p. 223 (1993).

* cited by examiner

Primary Examiner—Kelechi C. Egwim
(74) Attorney, Agent, or Firm—Sughrue Mion, Pllc.

(57) ABSTRACT

To provide a novel crosslinking system of fluorine-containing elastomer giving a crosslinked product particularly having improved mechanical strength and compression set at high temperature. A fluorine-containing rubber composition comprising a fluorine-containing elastomer having carboxyl group and/or alkoxycarbonyl group at an end of a trunk chain and/or branched chain as a crosslinkable group.

20 Claims, 2 Drawing Sheets

FLUORINE-CONTAINING ELASTOMER AND COMPOSITION THEREOF FOR CROSSLINKING

CROSS-REFERENCE TO RELATED APPLICATIONS

This is a Divisional of application Ser. No. 09/831,509 filed Sep. 28, 2001, now abandoned which is a 371 of PCT Application No. PCT/JP99/06243 filed Nov. 10, 1999, incorporated herein by reference.

TECHNICAL FIELD

The present invention relates to a fluorine-containing elastomer giving a novel crosslinking system, a preparation process thereof and a fluorine-containing rubber composition for crosslinking. According to the present invention, a crosslinked fluorine-containing rubber molded article being excellent in mechanical properties, particularly compression set and heat resistance can be provided.

BACKGROUND ART

Fluorine-containing elastomers, particularly perfluoro elastomers mainly comprising a tetrafluoroethylene (TFE) unit are widely used as a sealing material to be used under hard environment because of excellent chemical resistance, solvent resistance and heat resistance thereof.

However requirements for characteristics thereof required with advance of technology are becoming strict. In the fields of space aeronautics, semi-conductor production apparatuses and chemical plants, a sealing property under high temperature environment of 300° C. or more is demanded.

To cope with such requirements, proposals have been made to enhance heat resistance by improving a crosslinking system. As such a crosslinking system, there are known crosslinking methods, for example, a method of triazine crosslinking by forming a triazine ring with an organotin compound by using a fluorine-containing elastomer having a nitrile group introduced as a crosslinking point (for example, JP-A-58-152041), a method of oxazol crosslinking by forming an oxazol ring with bisaminophenol similarly by using a fluorine-containing elastomer having a nitrile group introduced as a crosslinking point (for example, JP-A-59-109546), a method of imidazole crosslinking by forming an imidazole ring with a bisdiaminophenyl compound (for example, JP-A-59-109546) and a method of thiazole crosslinking by forming a thiazole ring with bisaminothiophenol (for example, JP-A-8-104789).

In a series of PCT patent applications (WO97/19982, WO98/23653, WO98/23654 and WO98/23655) of Du Pont, U.S.A., it is proposed that an end of a fluorine-containing elastomer having nitrile group is converted to a carbonyl-containing end group for the purpose to increase a crosslinking rate in peroxide crosslinking system in addition to the above-mentioned triazine crosslinking system and oxazole crosslinking system.

However a crosslinked rubber obtained by a crosslinking system described in JP-A-58-152041, JP-A-59-109546 and JP-A-8-104789 is insufficient in a mechanical strength and compression set at high temperature because a crosslinkable functional group is present only in a branched chain derived from a cure site monomer.

An essential object of the inventions disclosed in the above-mentioned applications of Du Pont is to decrease the number of sulfonic acid end groups which may cause a crosslinking failure. To achieve such an object, the end groups are converted to carbonyl-containing groups. Namely, the crosslinking rate is enhanced by decreasing the number of sulfonic acid groups but not by using carbonyl-containing groups as crosslinking points. This can be seen from the description that it is preferable to decarboxylate carbonyl-containing end groups by heating to decrease a viscosity of the elastomer because the carbonyl-containing end groups ionized or to be ionized increase the viscosity of elastomer. In those publications, carboxyl group, carboxylic acid salt and carboxyamide group are raised as a carbonyl-containing end group. However since a metal salt is used for coagulation of the obtained emulsified polymer, carbonyl-containing end groups of the coagulated and isolated elastomer to be subjected to crosslinking have been converted to metal salts of carboxylic acid or carboxyamide group. It is assumed that those salts cause an increase in a viscosity of the elastomer. The decarboxylation treatment of the carbonyl-containing end groups indicates that the end groups are not used for crosslinking.

Further also in the crosslinking system of the invention of Du Pont, in which a fluorine- and nitrile-containing elastomer having a carbonyl-containing group as an end group is used, a mechanical strength and compression set at high temperature of the obtained crosslinked product are not improved.

An object of the present invention is to provide a novel crosslinking system of a fluorine-containing elastomer giving a crosslinked product having improved mechanical strength and compression set at high temperature.

DISCLOSURE OF INVENTION

Namely, the present invention relates to a fluorine-containing rubber composition for crosslinking comprising a fluorine-containing elastomer having carboxyl group and/or alkoxycarbonyl group at an end of a trunk chain and/or branched chain as a crosslinkable group and a crosslinked fluorine-containing rubber molded article obtained by crosslinking the fluorine-containing rubber composition, particularly to the fluorine-containing rubber composition for crosslinking comprising a fluorine-containing elastomer having carboxyl group as a crosslinkable group at an end of a trunk chain and/or branched chain, particularly at the ends and the crosslinked fluorine-containing rubber molded article obtained by crosslinking the fluorine-containing rubber composition.

Further the present invention relates to a process for preparing the fluorine-containing elastomer which is characterized in that after a fluorine-containing monomer is polymerized by using, as one of a polymerization initiator and/or monomer, a compound giving carboxyl group and/or alkoxycarbonyl group to an end of a trunk chain and/or branched chain, a polymerization product is treated with an acid.

Example of the preferred fluorine-containing elastomer is a novel crosslinkable fluorine-containing elastomer which has carboxyl group and/or alkoxycarbonyl group at an end of a trunk chain and/or branched chain as a crosslinkable group and is represented by the formula (I):

or the formula (II):

wherein $X^1$ and $X^2$ are the same or different and each is carboxyl group, alkoxycarbonyl group, iodine atom, bromine atom or sulfonic acid group, Y, $Y^1$ and $Y^2$ are the same or different and each is a divalent organic group having carboxyl group, alkoxycarbonyl group, iodine atom, bromine atom or nitrile group at a side chain thereof, A is an elastomeric fluorine-containing polymer chain segment (hereinafter referred to as "elastomeric segment A"), B is a non-elastomeric fluorine-containing polymer chain segment (hereinafter referred to as "non-elastomeric segment B"), p is 0 or an integer of 1 to 10, q is an integer of 1 to 5, r is 0 or an integer of 1 to 10, s is an integer of 1 to 3, any one of $X^1$, X2, Y, $Y^1$ and $Y^2$ is carboxyl group or alkoxycarbonyl group, Y, $Y^1$ and $Y^2$ may be contained at random in the segment A or B.

A preferred elastomeric fluorine-containing polymer chain segment is one comprising not less than 90% by mole of a perhalo olefin unit.

The present invention also relates to the fluorine-containing elastomer having carboxyl group at an end of a trunk chain as a crosslinkable group and represented by the formula (Ia):

(Ia)

or the formula (IIa):

(IIa)

wherein $X^1$ and $X^2$ are the same or different and each is carboxyl group, alkoxycarbonyl group, iodine atom, bromine atom or sulfonic acid group, Y, $Y^1$ and $Y^2$ are the same or different and each is a divalent organic group having carboxyl group, alkoxycarbonyl group, iodine atom, bromine atom or nitrile group at a side chain thereof, A is an elastomeric fluorine-containing polymer chain segment, B is a non-elastomeric fluorine-containing polymer chain segment, p is 0 or an integer of 1 to 10, q is an integer of 1 to 5, r is 0 or an integer of 1 to 10, s is an integer of 1 to 3, any one of $X^1$ and $X^2$ is carboxyl group, Y, $Y^1$ and $Y^2$ may be contained at random in the segment A or B.

In the formulae (I), (II), (Ia) and (IIa), examples of an alkoxyl group of the alkoxycarbonyl group are, for instance, linear or branched alkoxyl groups having 1 to 10 carbon atoms. A part of hydrogen atoms may be replaced by fluorine atoms.

Also it is preferable that the fluorine-containing elastomer of the present invention has a content of carboxyl group satisfying the equation (1):

$$(Sco/Scf) \times (D/Dp) \times (F/Fp) \geq 0.01 \qquad (1)$$

BEST MODE FOR CARRYING OUT THE INVENTION

First the crosslinkable fluorine-containing elastomer of the present invention is explained below.

The fluorine-containing elastomer to be used in the present invention is the elastomer having the elastomeric segment A as a trunk chain and represented by the formula (I):

(I)

or the fluorine-containing multi-segment elastomer having a trunk chain comprising the elastomeric segment A and the non-elastomeric segment B and represented by the formula (II):

(II).

In the formulae (I) and (II), $X^1$, $X^2$, Y, $Y^1$, $Y^2$, A, B, p, q, r and s are as defined above. Among them, the fluorine-containing elastomer having carboxyl group at an end of a trunk chain (namely, at least one of $X^1$ and $X^2$ is carboxyl group) and represented by the above-mentioned formula (Ia) or (IIa) is a novel elastomer.

The elastomeric segment A may be, for example, perfluoro elastomer segments such as a copolymer rubber represented by the formula (1):

wherein m is 95 to 50, n is 5 to 50 in mol ratio, $R_f$ is a perfluoroalkyl group having 1 to 8 carbon atoms and a terpolymer rubber represented by the formula (2):

wherein l is 95 to 35, m is 0 to 30, n is 5 to 35 in mol ratio, $R_f$ is a perfluoroalkyl group having 1 to 8 carbon atoms, or non-perfluoro elastomer segments such as a copolymer rubber represented by the formula (3):

wherein m is 85 to 60, n is 15 to 40 in mol ratio, a terpolymer rubber represented by the formula (4):

wherein l is 85 to 20, m is 0 to 40, n is 15 to 40 in mol ratio, a terpolymer rubber represented by the formula (5):

wherein l is 95 to 45, m is 0 to 10, n is 5 in mol ratio to 45, $Z^1$, $Z^2$ and $Z^3$ are fluorine atom or hydrogen atom individually, $R_f$ is a perfluoroalkyl group having 1 to 8 carbon atoms, (l/m = 20/80 to 80/20 in mol ratio), (l/m = 80/20 to 50/50 in mol ratio) and (l is 1 to 80, m is 0 to 80, n is 10 to 50 in mol ratio, $R_f$ is as defined above).

Preferable examples of Y, $Y^1$ and $Y^2$ for introducing a crosslinking point in the branched chain are, for instance, iodine-containing monomers represented by $CX^2$=CX—$R_f^1$ CHRI, wherein X is H, F or $CH_3$, $R_f^1$ is a linear or branched fluoro or perfluoro alkylene group, fluoro or perfluoro oxyalkylene group, fluoro polyoxyalkylene group or perfluoro polyoxyalkylene group which may have one or more ether type oxygen atoms, R is H or $CH_3$, bromine-containing monomers, nitrile group-containing monomers represented by:

wherein m is 0 to 5, n is 1 to 8, wherein m is 1 to 5, wherein n is 1 to 4, wherein n is 2 to 5, wherein n is 1 to 6, wherein n is 1 or 2, or wherein $X^3$ is CN, COOH or $COOR^1$, in which $R^1$ is an alkyl group which may have fluorine atom of C1 to C10, carboxyl group-containing monomers, alkoxycarbonyl group-containing monomers, and the like. Usually iodine-containing monomers, nitrile group-containing monomers and carboxyl group-containing monomers are suitable.

From the viewpoint of copolymerizability, examples of suitable iodine-containing monomer are perfluoro(vinyl ether) compounds, for instance, perfluoro(6,6-dihydro-6-iodo-3-oxa-1-hexene), perfluoro(5-iodo-3-oxa-1-pentene), and the like.

In addition, there are fluoro vinyl ethers described in JP-B-5-63482 and represented by the formula:

$ICH_2CF_2CF_2(OCFY^3CF_2)_nOCF=CF_2$ wherein $Y^3$ is trifluoromethyl group, n is 0 to 2.

Also $CF_2$=CHI, and the like can be used suitably.

When at least one of end groups $X^1$ and $X^2$ is carboxyl group or alkoxycarbonyl group, a unit having nitrile group or carboxyl group is preferable from the viewpoint of crosslinkability.

The non-elastomeric segment B is not limited basically as far as the segment contains fluorine atom and does not have the above-mentioned elastomeric property. The non-elastomeric segment B may be selected depending on characteristics and function intended to obtain by copolymerization thereof. Particularly a crystalline polymer chain segment having a crystalline melting point of not less than 150° C. is preferable in order to impart mechanical properties.

Among the monomers being capable of constituting the non-elastomeric segment B, examples of the fluorine-containing monomer are, for instance, one or two or more of perhalo olefins such as TFE, chlorotrifluoroethylene (CTFE), perfluoro(alkyl vinyl ether) (PAVE), hexafluoropropylene (HFP), $CF_2$=$CF(CF_2)_pX$, wherein p is an integer of 1 to 10, X is F or Cl and perfluoro-2-butene; and partly fluorinated olefins such as vinylidene fluoride, vinyl fluoride, trifluoroethylene, wherein $X^4$ and $X^5$ are H or F, q is an integer of 1 to 10 and $CH_2$=$C(CF_3)_2$. Also one or two or more of monomers copolymerizable therewith, for example, ethylene, propylene, vinyl chloride, vinyl ethers, carboxylic acid vinyl esters and acryls can be used as copolymerizable components.

Among them, from the viewpoint of chemical resistance and heat resistance, preferable examples of the monomer to be used as a main component are, for instance, a sole use of fluorine-containing olefin, a combination use of fluorine-containing olefins, a combination use of ethylene and TFE and a combination use of ethylene and CTFE. Particularly a sole use of perhalo olefin and a combination use of perhalo olefins are preferable.

Examples thereof are
(1) VdF/TFE (0 to 100/100 to 0), particularly VdF/TFE (70 to 99/30 to 1), PTFE or PVdF;
(2) ethylene/TFE/HFP (6 to 60/40 to 81/1 to 30), 3,3,3-trifluoropropylene-1,2-trifluoromethyl-3,3,3-trifluoropropylene-1/PAVE (40 to 60/60 to 40);

(3) TFE/CF$_2$=CF—R$_f^3$ (amount exhibiting non-elastomeric property, namely, an amount of CF$_2$=CF—R$_f^3$ is not more than 15% by mole. R$_f^3$ is a linear or branched fluoro or perfluoro alkyl group or fluoro or perfluoro oxyalkyl group which may have at least one ether type oxygen atom);
(4) VdF/TFE/CTFE (50 to 99/30 to 0/20 to 1);
(5) VdF/TFE/HFP (60 to 99/30 to 0/10 to 1);
(6) ethylene/TFE (30 to 60/70 to 40);
(7) polychlorotrifluoroethylene (PCTFE);
(8) ethylene/CTFE (30 to 60/70 to 40);

and the like. Among them, from the viewpoint of chemical resistance and heat resistance, non-elastomeric copolymers, particularly PTFE and TFE/CF$_2$=CF—R$_f^3$ (R$_f^3$ is as defined above) are preferable.

Also the above-mentioned unit Y$^2$ giving curing sites may be introduced for various crosslinking systems as a monomer being capable of constituting the non-elastomeric segment B in an amount of not more than 5% by mole, preferably not more than 2% by mole.

A block copolymerization of the non-elastomeric segment B can be carried out, for example, by changing to the monomer for the non-elastomeric segment B subsequently to emulsion polymerization of the elastomeric segment A.

A number average molecular weight of the non-elastomeric segment B can be adjusted in a wide range of 1,000 to 1,200,000, preferably 3,000 to 400,000.

The non-elastomeric segment B can be surely block-copolymerized with the elastomeric segment A when the elastomeric segment A comprises not less than 90% by mole, particularly not less than 95% by mole of perhalo olefin unit as a component unit thereof. And also a molecular weight (degree of polymerization) of the non-elastomeric segment B can be increased.

As mentioned above, X$^1$ and X$^2$ which are end groups of the elastomer are carboxyl group, alkoxycarbonyl group, iodine atom, bromine atom or sulfonic acid group. Example of the method for introducing such a functional group to the ends of elastomer is a method of treating with an acid which is described hereinafter.

A feature of the present invention is to use fluorine-containing elastomers in which at least one of X$^1$, X$^2$, Y, Y$^1$ and Y$^2$ which can become a crosslinking point is carboxyl group or alkoxycarbonyl group. Among them, as mentioned above, the fluorine-containing elastomer represented by the formula (Ia) or (IIa) and having carboxyl group at an end of a trunk chain thereof (namely, at least one of X$^1$ and X$^2$ is carboxyl group) is a novel elastomer.

The above-mentioned patent publications of Du Pont discloses a fluorine-containing elastomer having a carbonyl-containing end group, and carboxyl group, carboxylic acid salt and carboxyamide group are raised therein as the carbonyl group-containing group. However in the patent publications, those groups are treated as a carbonyl group-containing group collectively without being discriminated from each other, and it is unknown whether or not carboxyl group is actually present on the end group of a trunk chain. According to knowledge of the inventors of the present invention, under the polymerization conditions and coagulation conditions, particularly under condition of a pH value of 3.5 to 7.0 which are described in those International Patent Publications, the end group is substantially a metal salt or ammonium salt of carboxyl group, and it is assumed that not only alkoxycarbonyl group but also free carboxyl group are scarcely present.

Another feature of the present invention is that the fluorine-containing elastomer of the present invention is not a polymerization product itself but a fluorine-containing elastomer isolated from a reaction product mixture of the polymerization. Therefore if a crosslinking agent is added to the elastomer or high energy rays are irradiated thereto, the elastomer is in a state of so-called a mass being crosslinkable.

As mentioned above, a polymerization reaction product (elastomer) obtained by polymerization represented by emulsion polymerization is usually subjected to crosslinking after isolated from the reaction product mixture of the polymerization by coagulation with a metal salt. Therefore even if the polymerization product contains carboxyl group, the carboxyl group is converted to a carboxylic acid salt at the stage of salting out, and a fluorine-containing elastomer having free carboxyl group has not yet been obtained. For that reason, enhancement of mechanical strength and compression set of a crosslinked product has been inhibited.

As mentioned above, there have been no fluorine-containing elastomers represented by not only the above-mentioned formulae (Ia) and (IIa) but also the formulae (I) and (II) being in a crosslinkable state.

From the viewpoint of securing crosslinking points to enhance heat resistance and compression set, it is preferable that a content of carboxyl group in the novel fluorine-containing elastomers of the present invention represented by the formulae (Ia) and (IIa) satisfies the following equation (1):

$$(Sco/Scf) \times (D/Dp) \times (F/Fp) \geqq 0.01$$

Then the abbreviations in the equation (1) are explained below.

Sco, Scf, D, Dp, F and Fp are the following respective values of the aimed fluorine-containing elastomer of the present invention and a standard perfluoro elastomer mentioned below.

Sco: Total area of absorbances at the absorptions derived from carbonyl group of associated and non-associated carboxyl groups having the absorption peaks at from 1,680 to 1,830 cm$^{-1}$ when measurement is made with FT-IR with respect to the elastomer to be measured. For example, in case of TFE/perfluoro(methyl vinyl ether) (PMVE)/CF$_2$=CFOCF$_2$CF(CF$_3$)OCF$_2$CF$_2$X, in which X is CN or COOH, an absorption derived from the associated carbonyl group appears at 1,800 to 1,820 cm$^{-1}$ and an absorption derived from the non-associated carbonyl group appears at 1,760 to 1,780 cm$^{-1}$.

Scf: Area of absorbance at absorption derived from a harmonic sound of C—F bond having an absorption peak at from 2,220 to 2,840 cm$^{-1}$ when measurement is made with FT-IR with respect to the elastomer to be measured. In case where nitrile group is present, Scf is a value obtained by subtracting an area of absorbance at absorption derived from nitrile group having an absorption peak at from 2,220 to 2,300 cm$^{-1}$ from a total area of absorbance at whole absorption having a peak at from 2,220 to 2,840 cm$^{-1}$. This correction is made to eliminate an influence of absorption derived from nitrile group since a peak of the absorption appears at from 2,220 to 2,300 cm$^{-1}$ when nitrile group is present.

D: Specific gravity at 20° C. of the elastomer to be measured.

Dp: Specific gravity (measured value: 2.03) at 20° C. of a standard perfluoro elastomer (copolymer of TFE/PMVE in a mole ratio of 58/42, measured with $^{19}$F-NMR). The reason why a copolymer comprising TFE/PMVE in a mole ratio of 58/42 is used as a standard perfluoro elastomer is that it is easily obtainable.

F: Fluorine content (% by weight) of the elastomer to be measured obtained by elemental analysis.

Fp: Fluorine content (measured value: 71.6% by weight) of the above-mentioned standard perfluoro elastomer obtained by elemental analysis.

Then explained below is a meaning which the equation (1) has.

The term Sco/Scf is a proportion of carbonyl group (carbonyl group of carboxyl group, hereinafter the same) to C—F bond in the fluorine-containing elastomer. In case where the fluorine-containing elastomer of the present invention is a perfluoro elastomer, only this term may be used. Namely, $Sco/Scfp \geq 0.01$ (Scfp: Area absorbance of C—F bond of perfluoro elastomer).

The terms D/Dp and F/Fp are those used for correction in case where the fluorine-containing elastomer of the present invention is obtained by copolymerizing a non-perfluoro elastomer, for example, vinylidene fluoride. Namely, when a non-perfluoro elastomer such as vinylidene fluoride is copolymerized, an amount of C—F bonds in the elastomer decreases relatively and an area of absorbance of C—F bonds measured with transmission IR analyzer decreases relatively.

In general in case where the measurement is made with a transmission IR, an area absorbance of C—F is proportional to the number of moles of fluorine atoms per a unit area of the elastomer (a value obtained by dividing a weight of fluorine atom by an atomic weight 19 of fluorine). Thereby a weight of perfluoro elastomer having a volume V is V×Dp (Dp is a specific gravity of perfluoro elastomer), and thus a weight of fluorine in the perfluoro elastomer is V×Dp×Fp/100 (Fp is a fluorine content of the perfluoro elastomer (Fp % by weight)) and the number of moles of fluorine is V×Dp×Fp/1900. Similarly the number of moles of fluorine in a non-perfluoro elastomer having a volume V is V×D×F/1900 (D and F are a specific gravity and fluorine content of non-perfluoro elastomer, respectively).

Provided that an area of absorbance of C—F bond of the perfluoro elastomer is Scfp and an area of absorbance of C—F bond of the non-perfluoro elastomer is Scf, since the area of abosrbance of C—F bond is proportional to the number of moles, an equation Scfp/Scf=VDpFp/VDF is obtained and thus an equation Scfp=(DpFp/DF)×Scf is obtained. When this equation is substituted for the equation $Sco/Scfp \geq 0.01$ of the perfluoro elastomer, the above-mentioned equation (1) can be obtained.

In the equation (1), the following measuring methods and apparatuses are used.

(FT-IR Measurement)

Measuring apparatus: FT-IR Spectro Meter Model 1760X available from Perkin Elmer Co., Ltd.

Sample: About 0.1 mm thick film

Measuring conditions: Resolution 2 cm$^{-1}$, Data interval 1 cm$^{-1}$, measured by transmission method (Elemental Analysis)

Measuring apparatus: Micro Processor Ionalyzer Model 901 available from Orion Research Co., Ltd.

Measuring method: A small amount of $Na_2O_2$ (combustion improver) is added to 1.4 to 1.9 mg of the sample, followed by combustion in a combustion flask containing 25 ml of pure water. After allowing to stand for 30 minutes, 10 ml is sampled and thereto is added 10 ml of a solution (10 liter of a solution comprising 500 ml of acetic acid, 500 g of sodium chloride, 5 g of tri-sodium citrate dihydrate, 320 g of sodium hydroxide and pure water). Then an amount of F ion is measured with F ion meter.

(Specific Gravity)

Measuring apparatus: Automatic densimeter Model D-1 available from Kabushiki Kaisha Toyo Seiki Seisakusho Measuring condition: 20° C.

The equation (1) means that the fluorine-containing elastomer of the present invention, irrespective of perfluoro elastomer or non-perfluoro elastomer, contains not less than 1 mmol of carboxyl group per 1 kg of the polymer. Particularly preferable is 10 to 250 mmol. When the elastomer is prepared by copolymerizing a carboxyl group-containing monomer, it is preferable that a copolymerized proportion of the carboxyl group-containing monomer is from 0.3 to 2% by mole.

From the viewpoint of enhancement of physical properties of the obtained crosslinked product, carboxyl groups are preferably bonded to end groups $X^1$ and $X^2$ of a trunk chain.

The fluorine-containing elastomer of the present invention can be prepared by polymerization methods such as emulsion polymerization, suspension polymerization and solution polymerization.

It is preferable to use a polymerization initiator which makes it possible that carboxyl groups or groups being capable of forming carboxyl group (for example, acid fluoride, acid chloride, $CF_2OH$, any of which form carboxyl group in the presence of water) are present at an end of the elastomer. Examples thereof are ammonium persulfate (APS) and potassium persulfate (KPS).

Also a chain transfer agent which is usually used for adjusting a molecular weight may be used. However a use thereof may be avoided as far as possible because a proportion of groups being capable of forming carboxyl groups or alkoxycarbonyl groups to be introduced into the ends of the elastomer is reduced. This does not apply to the case where the polymerization initiator can make it possible that the above-mentioned groups are present at the ends of elastomer. When the chain transfer agent is not used, a molecular weight of the elastomer may be adjusted by carrying out the polymerization at a low pressure, for example, at a pressure less than 2 MPa·G, preferably a pressure of not more than 1 MPa·G. Other polymerization conditions are not limited particularly. However when producing a polymerization product having carboxyl group at an end and/or branched chain thereof without acid treatment explained below, it is preferable that a pH value of a polymerization system is adjusted to a strong acid having a pH value of not more than 3.

Among the so-obtained polymerization products, some of them do not contain free carboxyl group depending on the polymerization conditions. However by the acid treatment mentioned below, conversion to free carboxyl group can be carried out.

One of major features of the present invention is to carry out an acid treatment of a polymerization product to convert groups such as a metal salt and ammonium salt of carboxylic acid being present therein to carboxyl group. Examples of the proper acid treatment method are a method of washing the polymerization product, for example, with hydrochloric acid, sulfuric acid, nitric acid, or the like and a method of adjusting a system of a mixture after the polymerization reaction to a pH value of not more than 3 with such an acid.

It is preferable from the viewpoint of reduction of steps that the acid treatment is applied as means for coagulation when isolating the polymerization product from the poly- merization reaction mixture by coagulation. The polymerization product may be isolated by means of freeze drying, or the like after the acid treatment of the polymerization mixture. Further a coagulation method by ultrasonic wave or by mechanical force may be employed.

Also carboxyl group can be introduced by oxidizing a fluorine-containing elastomer containing iodine or bromine with a fuming nitric acid.

Further the present invention relates to the fluorine-containing rubber composition containing the fluorine-containing elastomer having carboxyl group and/or alkoxycarbonyl group at an end of a trunk chain and/or branched chain thereof as crosslinkable group, particularly the fluorine-containing elastomer represented by the formula (I) or (II).

The fluorine-containing rubber composition of the present invention can be crosslinked by a method of crosslinking without using a crosslinking agent, for example, high energy ray irradiation methods such as electron beam irradiation method, radiation method and ultraviolet ray irradiation method. However preferably a crosslinking agent reactable with carboxyl group or alkoxycarbonyl group, particularly a crosslinking agent which is used in oxazole crosslinking system, imidazole crosslinking system and thiazole crosslinking system is blended.

Examples of the crosslinking agent which is used in oxazole crosslinking system, imidazole crosslinking system and thiazole crosslinking system are, for instance, bisdiaminophenyl crosslinking agent represented by the formula (III):

wherein $R^3$ is —$SO_2$—, —O—, —CO—, an alkylene group having 1 to 6 carbon atoms, a perfluoroalkylene group having 1 to 10 carbon atoms or a single bond, one of $R^1$ and $R^2$ is $NH_2$ and another one is —$NH_2$, —OH or —SH and preferably each of $R^1$ and $R^2$ is —$NH_2$, bisaminophenol crosslinking agent, bisaminothiophenol crosslinking agent, bisamidrazone crosslinking agent represented by the formula (IV):

(wherein $R^3$ is as defined above, $R^6$ is bisamidoxime crosslinking agent represented by the formula (V) or (VI):

wherein $R_f^3$ is a perfluoroalkylene group having 1 to 10 carbon atoms, wherein n is an integer of 10 to 10, and the like. Those bisaminophenol crosslinking agent, bisaminothiophenol crosslinking agent and bisdiaminophenyl crosslinking agent have been used for a crosslinking system employing nitrile group as a crosslinking point, but are reacted with carboxyl group or alkoxycarbonyl group which the fluorine-containing elastomer of the present invention has to form an oxazole ring, thiazole ring or imidazole ring and give a crosslinked product.

Particularly preferable crosslinking agents are compounds having a plurality of 3-amino-4-hydroxyphenyl groups, 3-amino-4-mercaptophenyl groups or 3,4-diaminophenyl groups represented by the formula:

wherein $R^3$ is as defined above. Examples thereof are, for instance, 2,2-bis(3-amino-4-hydroxyphenyl)hexafluoropropane (general term" bis(aminophenol) AF), 2,2-bis(3-amino-4-mercaptophenyl)hexafluoropropane, tetraamino benzene, bis-3,4-diaminophenylmethane, bis-3,4-diaminophenylether, 2,2-bis(3,4-diaminophenyl)hexafluoropropane, and the like.

An amount of the crosslinking agent is preferably from 0.1 to 10 parts by weight based on 100 parts by weight of the elastomer.

To the composition of the present invention can be added additives which are usually added to a fluorine-containing elastomer composition as case demands, for example, a filler, processing aid, plasticizer, coloring agent, and the like. In addition to the above-mentioned additives, one or more of usual crosslinking agent and crosslinking accelerator other than the above-mentioned ones may be blended. Also a known fluorine-containing rubber may be mixed in a range not lowering an effect of the present invention.

The composition of the present invention can be prepared by mixing each of the above-mentioned components by using usual processing equipment for rubber, for example, an open roll, Banbury mixer, kneader, or the like. In addition, the composition can be prepared also by a method of using a closed mixer and a method of co-coagulation through emulsion mixing.

For producing a pre-molded article from the above-mentioned composition, usual known methods may be employed, such as a method of heating and compressing in a metal mold, a method of putting in a heated metal mold under pressure or a method of extruding with an extruder. In cases of extruded products such as a hose and cable, since shapes thereof can be maintained even after the extruding, a pre-molded article extruded without using a crosslinking agent can be used as it is. Of course, it is possible to use a pre-molded article subjected to crosslinking by heating with steam by using a crosslinking agent. Also in case of a shaped product such as O-ring, when it is difficult to hold a shape of the product in an un-crosslinked state after mold-releasing, it is possible to maintain the shape by using a pre-molded article crosslinked previously by using a crosslinking agent.

In the present invention when carrying out oxazole crosslinking by using a crosslinking agent such as bisaminophenol, the crosslinking can be carried out under usual crosslinking conditions for fluorine-containing rubbers. For example, a crosslinked rubber can be obtained by putting a fluorine-containing elastomer in a metal mold, carrying out press-crosslinking by holding under pressure at 120° to 250° C. for 1 to 60 minutes and then crosslinking in an oven by holding at 120° to 320° C. for 0 to 48 hours. Also to formulations of known crosslinking methods for fluorine-containing rubber such as polyamine crosslinking, polyol crosslinking and peroxide crosslinking, a crosslinking agent such as bis(aminophenol) AF is co-used to crosslink the rubber.

Also imidazole crosslinking in which carboxyl group is crosslinked with bisdiaminophenyl crosslinking agent is optimum for a polymer containing carboxyl group at other point than end thereof, and gives a crosslinked product having good physical properties at a relatively low crosslinking temperature (for example, 150° to 230° C., preferably 170° to 200° C.).

The present invention also relates to the so-obtained crosslinked product. In the crosslinked product of the present invention, since even the end group of the fluorine-containing elastomer can be crosslinked as crosslinking point, a high mechanical strength which has not been obtained can be provided. Furthermore it is a surprising fact that a compression set which is an index for evaluating a sealing property essential particularly for a sealing material is greatly reduced and also a compression set at high temperature is reduced.

The crosslinked product of the present invention is useful as various molded articles in the fields shown in Tables 1, 2 and 3 on the following pages.

TABLE 1

| Field of industry | Sub-field of industry | Final product | Equipment | Parts |
| --- | --- | --- | --- | --- |
| Electrical | Semi-conductor | Semi-conductor production apparatuses | CVD equipment | O (square) ring, packing sealing material, tube, roll |
| | | Liquid crystal panel production apparatus | Dry etching equipment | Coating, lining, gasket, diaphragm, hose |
| | | Plasma panel production apparatus | Wet etching equipment | |
| | | | Oxidation and diffusion equipment | |
| | | | Sputtering equipment | |
| | | | Ashing equipment | |
| | | | Cleaning equipment | |
| | | | Ion implantation equipment | |
| Transportation | Vehicle | Car | Engine and auxiliary equipment | Gasket, shaft seal, valve stem seal, sealing material, hose |
| | | | AT | Hose, sealing material |
| | | | Fuel line and auxiliary equipment | O (square) ring, tube, packing, core material of valve, hose, sealing material, diaphragm |
| | Aircraft | Aircraft | Fuel line | Diaphragm, O (square) ring, valve, tube, |
| | Rocket | Rocket | Fuel line | packing, hose, sealing material ditto |
| | Ship | Ship | Fuel line | ditto |
| Chemical | Chemical products | Plant | Production line of chemicals such as pharmaceutical, agricultural chemical, coating and resin (Petroleum) | Lining, valve, packing, roll, hose, diaphragm, O (square) ring, tube, sealing material |
| | Chemicals | Pharmaceuticals | Plug for chemicals | Plug for chemicals |
| Mechanical | Photograph | Developing machine | Film developing machine | Roll |
| | | | X-ray film developing machine | Roll |
| | Printing | Printing machine | Printing roll | Roll |
| | Coating | Coating facilities | Coating roll | Roll |
| | Analyzer and physical and chemical appliances | | | Tube |
| Food | Plant | | Food processing line | Lining, valve, packing, roll, hose, diaphragm, O (square) ring, tube, sealing material |
| Metal | Steel making | Steel sheet processing facilities | Steel sheet processing roll | Roll |

TABLE 2

| Field of Industry | Characteristics Required |
| --- | --- |
| Electrical | Plasma resistance, acid resistance, alkali resistance, amine resistance, ozone resistance, gas resistance, chemical resistance, cleanliness, heat resistance |

TABLE 2-continued

| Field of Industry | Characteristics Required |
|---|---|
| Transportation | Heat resistance, amine resistance |
| | Heat resistance, amine resistance |
| | Fuel resistance, fuel permeability, heat resistance |
| | Fuel resistance, fuel permeability, heat resistance |
| | Fuel resistance, fuel permeability, heat resistance |
| | Fuel resistance, fuel permeability, heat resistance |
| Chemical | Chemical resistance, solvent resistance, heat resistance |
| | Chemical resistance, solvent resistance, heat resistance |
| | Cleanliness |
| Mechanical | Chemical resistance |
| | Chemical resistance |
| | Solvent resistance |
| | Solvent resistance |
| Food | Chemical resistance, solvent resistance, heat resistance |
| Metal | Heat resistance, acid resistance |

TABLE 3

| Field of industry | Parts |
|---|---|
| Electrical | O ring and sealing material for gate valve of corresponding product or equipment |
| | O ring and sealing material for quartz window of corresponding product or equipment |
| | O ring and sealing material for chamber of corresponding product or equipment |
| | O ring and sealing material for gate of corresponding product or equipment |
| | O ring and sealing material for bell jar of corresponding product or equipment |
| | O ring and sealing material for coupling of corresponding product or equipment |
| | O ring and sealing material for pump of corresponding product or equipment |
| | O ring and sealing material for gas controller for semi-conductor of corresponding product or equipment |
| | O ring and sealing material for resist developing and releasing solutions |
| | O ring and sealing material for wafer cleaning solution |
| | Diaphragm of pump for corresponding production equipment |
| | Hose for resist developing and releasing solutions |
| | Hose and tube for wafer cleaning solution |
| | Roll for transferring wafer |
| | Lining and coating of tanks for resist developing and releasing solutions |
| | Lining and coating of tanks for wafer cleaning solution |
| | Lining and coating of tanks for wt etching |
| Transportation | Engine head gasket |
| | Metal gasket |
| | Crank shaft seal |
| | Cam shaft seal |
| | Valve stem seal |
| | Manifold packing |
| | Oil hose |
| | Seal for oxygen sensor |
| | ATF hose |
| | Injector O ring |
| | Injector packing |
| | O ring and diaphragm for fuel pump |
| | Fuel hose |
| Chemical | |
| Mechanical | Developing roll |
| | Developing roll |
| | Gravure roll |
| | Guide roll |
| | Gravure roll for magnetic tape production and coating line |
| | Guide roll for magnetic tape production and coating line |
| | Various coating rolls |
| Food | |
| Metal | |

Particularly the crosslinked product of the present invention can be used built-in the following semiconductor manufacturing equipment.

(1) Etching System
Dry etching equipment
 Plasma etching machine
 Reactive ion etching machine
 Reactive ion beam etching machine
 Sputter etching machine
 Ion beam etching machine
Wet etching equipment
Ashing equipment (2) Cleaning System
Dry etching cleaning equipment
 UV/O$_3$ cleaning machine
 Ion beam cleaning machine
 Laser beam cleaning machine
 Plasma cleaning machine
 Gas etching cleaning machine
Extractive cleaning equipment
 Soxhlet extractive cleaning machine
 High temperature high pressure extractive cleaning machine
 Microwave extractive cleaning machine
 Supercritical extractive cleaning machine (3) Exposing System
Stepper
Coater and developer (4) Polishing System
CMP equipment (5) Film Forming System
CVD equipment Sputtering equipment (6) Diffusion and Ion Implantation System
Oxidation and diffusion equipment
Ion implantation equipment The present invention is then explained by means of examples, but is not limited to them.

EXAMPLE 1

A 3-liter stainless steel autoclave having no ignition source was charged with 1 liter of pure water, 10 g of an emulsifying agent;

and 0.09 g of disodium phosphate.$12H_2O$ as a pH control agent. After the inside of a system was replaced sufficiently with nitrogen gas and deairing was carried out, the autoclave was heated to 50° C. with stirring at 600 rpm, and a gas mixture of tetrafluoroethylene (TFE)/perfluoro(methyl vinyl ether) (PMVE) (TFE/PMVE=25/75 in mole ratio) was introduced so that the inside pressure would become 0.78 MPa·G. Then 10 ml of an aqueous solution of ammonium persulfate (APS) having a concentration of 527 mg/ml was introduced with pressurized nitrogen gas to initiate a reaction.

With the advance of the polymerization, at the time when the inside pressure was lowered to 0.69 MPa·G, 3 g of $CF_2=CFOCF_2CF(CF_3)OCF_2CF_2CN$ (CNVE) was introduced with pressurized nitrogen. Then 4.7 g of TFE and 5.3 g of PMVE were introduced at the respective self-pressures so that the inside pressure would become 0.78 MPa·G. Thereafter with the advance of the reaction, pressurized TFE and PMVE were introduced similarly. Thus increasing and decreasing of the inside pressure were repeated between 0.69 MPa·G and 0.78 MPa·G, and in addition, at the time when a total amount of TFE and PMVE reached 70 g, 130 g, 190 g and 250 g, respectively, 3 g of CNVE was introduced with pressurized nitrogen.

Nineteen hours after starting of the polymerization, when a total amount of TFE and PMVE reached 300 g, the autoclave was cooled and un-reacted monomer was released to give 1,330 g of aqueous dispersion having a solid concentration of 21.2% by weight.

Then 1,196 g of the obtained aqueous dispersion was diluted with 3,588 g of water and added slowly to 2,800 g of an aqueous solution of 3.5% by weight of hydrochloric acid with stirring. After the addition, stirring was carried out for five minutes and a coagulated product was filtrated. The obtained polymer was put in 2 kg of HCFC-141b, followed by stirring for five minutes and filtrating again. After that, washing with HCFC-141b and filtration were repeated four times and vacuum drying was carried out at 60° C. for 72 hours to give 240 g of polymer (nitrile group-containing elastomer).

As a result of $^{19}F$-NMR analysis, the obtained polymer was a polymer comprising TFE/PMVE/CNVE=56.6/42.3/1.1% by mole. Also as a result of measurement by infrared spectroscopic analysis, a chart shown in FIG. 1 was obtained.

Figure 1:
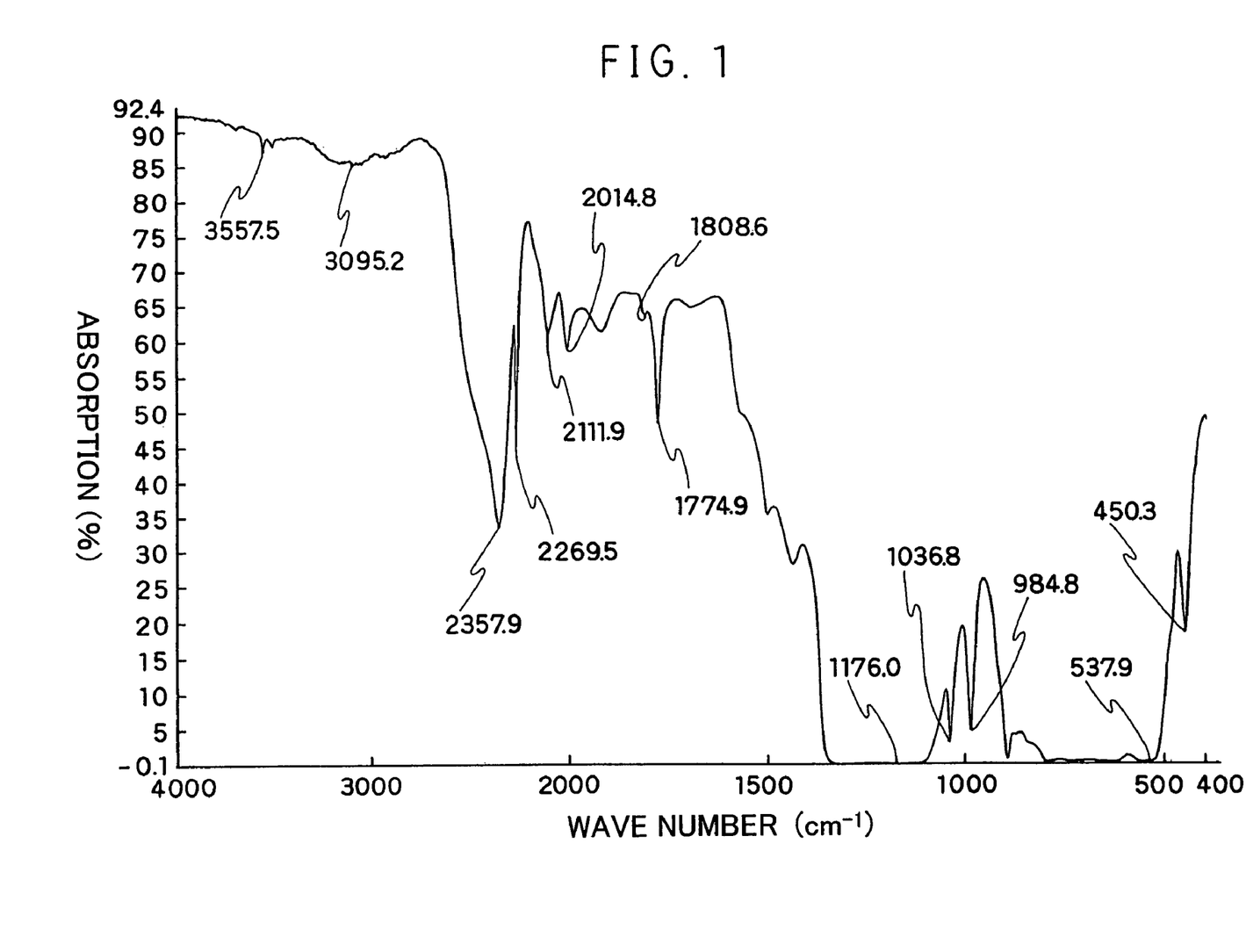
FIG. 1 is a chart of infrared spectroscopic analysis of the fluorine-containing elastomer of the present invention obtained in Example 1.

In the chart of FIG. 1, a characteristic absorption of carboxyl group was recognized around 1,774.9 $cm^{-1}$ and 1,808.6 $cm^{-1}$ and a characteristic absorption of OH group was recognized around 3,557.5 $cm^{-1}$ and 3,095.2 $cm^{-1}$. A value obtained from the equation (Sco/Scf)×(D/Dp)×(F/Fp) was 0.040.

When an elastomer obtained by coagulation of the obtained product with magnesium chloride and ethanol was subjected to IR analysis for reference purpose, an absorption derived from carboxyl group was not present and an absorption of magnesium salt of carboxylic acid was recognized at 1,729 $cm^{-1}$.

Further when the coagulation was carried out by freeze coagulation (pH: 3.5 to 7.0) and the obtained elastomer was subjected to IR analysis similarly, an absorption of carboxyl group was not present and an absorption of ammonium salt (—$COONH_4$) of carboxylic acid was recognized at 1,651 $cm^{-1}$.

The obtained fluorine-containing elastomer (nitrile-containing elastomer having carboxyl groups at ends thereof of the present invention, 2,2-bis(3-amino-4-hydroxyphenyl) hexafluoropropane (bis(aminophenol) AF) as a crosslinking agent and carbon black (Thermax N-990 available from Cancarb Co., Ltd.) as a filler were mixed in a weight ratio of 100/2/20, and the mixture was kneaded with an open roll to give a crosslinkable fluorine-containing rubber composition.

After the fluorine-containing rubber composition was subjected to pressing at 180° C. for 10 minutes for crosslinking, further a two-staged crosslinking in an oven was carried out under the conditions mentioned in Table 4. Thus a 2 mm thick crosslinked product and a sample O-ring (AS-568A-214) were produced. The results of measurements of the crosslinked product with respect to crosslinkability, physical properties in ordinary state and compression set are shown in Table 4.

(Crosslinkability)

Vulcanization curves of each composition for crosslinking were obtained at a temperature shown in Table 4 with JSR Curastometer Model II and then a minimum viscosity (ν min), maximum viscosity (ν max), induction time ($T_{10}$) and optimum vulcanization time ($T_{90}$) were obtained.

(Physical Properties in Ordinary State)

A 100% modulus, tensile strength, tensile elongation and hardness (JIS Hardness A) of a 2 mm thick crosslinked product in ordinary state (25° C.) were measured according to JIS K6301.

(Compression Set)

A compression set of the O-ring (AS-568A-214) was measured according to JIS K6301 after allowing to stand at 200° C. for 70 hours, 200° C. for 168 hours, 230° C. for 70 hours and 230° C. for 168 hours, respectively.

EXAMPLE 2

A 3-liter stainless steel autoclave having no ignition source was charged with 1 liter of pure water, 10 g of an emulsifying agent;

and 0.09 g of disodium phosphate.$12H_2O$ as a pH control agent. After the inside of a system was replaced sufficiently with nitrogen gas and deairing was carried out, the autoclave was heated to 50° C. with stirring at 600 rpm, and a gas mixture of tetrafluoroethylene (TFE)/perfluoro(methyl vinyl ether) (PMVE) (TFE/PMVE=25/75 in mole ratio) was introduced so that the inside pressure would become 0.78 MPa·G. Then 10 ml of an aqueous solution of ammonium persulfate (APS) having a concentration of 527 mg/ml was introduced with pressurized nitrogen gas to initiate a reaction.

With the advance of the polymerization, at the time when the inside pressure was lowered to 0.69 MPa·G, 3.78 g of CF$_2$=CFOCF$_2$CF(CF$_3$)OCF$_2$CF$_2$COOH (CBVE) was introduced with pressurized nitrogen. Then 4.7 g of TFE and 5.3 g of PMVE were introduced at the respective self-pressures so that the inside pressure would become 0.78 MPa·G. Thereafter with the advance of the reaction, pressurized TFE and PMVE were introduced similarly. Thus increasing and decreasing of the inside pressure were repeated between 0.69 MPa·G and 0.78 MPa·G. 4.2 Hours after starting of the polymerization reaction, when a total amount of TFE and PMVE reached 80 g, the autoclave was cooled and un-reacted monomer was released to give 1,091 g of an aqueous dispersion having a solid concentration of 7.5% by weight.

Then 1,000 g of the obtained aqueous dispersion was diluted with 3,000 g of water and added slowly to 2,800 g of an aqueous solution of 3.5% by weight of hydrochloric acid with stirring. After the addition, stirring was carried out for five minutes and a coagulated product was filtrated. The obtained polymer was put in 800 g of HCFC-141b, followed by stirring for five minutes and filtrating again. After that, washing with HCFC-141b and filtration were repeated four times and vacuum drying was carried out at 120° C. for 72 hours to give 72 g of polymer.

As a result of $^{19}$F-NMR analysis, the obtained polymer was a polymer comprising TFE/PMVE/CBVE=57.3/41.8/0.9% by mole. Also as a result of measurement by infrared spectroscopic analysis, a chart shown in FIG. 2 was obtained.

Figure 2:
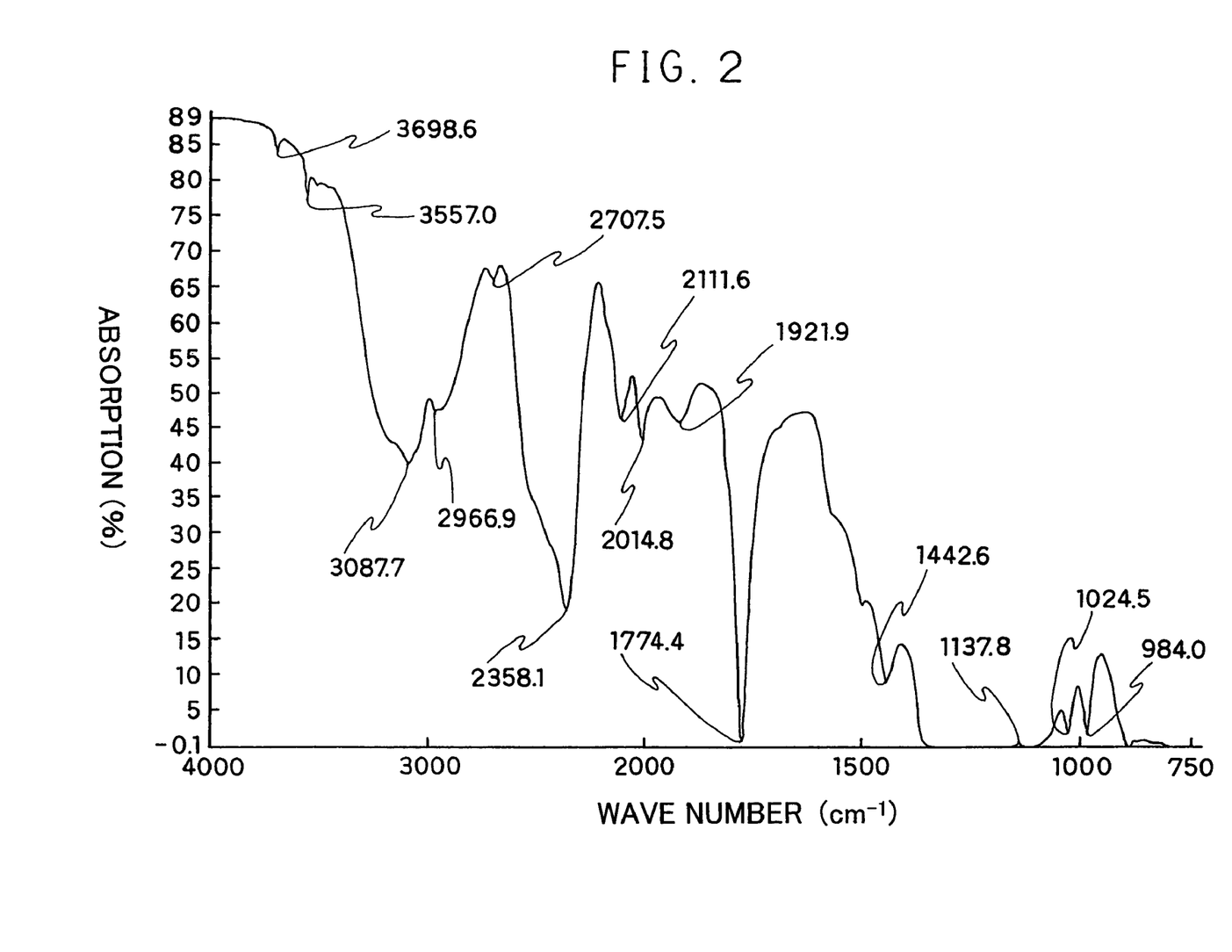
FIG. 2 is a chart of infrared spectroscopic analysis of the fluorine-containing elastomer of the present invention obtained in Example 2.

In the chart of FIG. 2, a characteristic absorption of carboxyl group was recognized around 1,774.4 cm$^{-1}$ and a characteristic absorption of OH group was recognized around 3,557.0 cm$^{-1}$ and 3,087.7 cm$^{-1}$. A value obtained from the equation (Sco/Scf)×(D/Dp)×(F/Fp) was 0.53.

The obtained fluorine-containing elastomer (carboxyl group-containing elastomer), 2,2-bis(3-amino-4-hydroxyphenyl) hexafluoropropane (bis(aminophenol) AF) as a crosslinking agent and carbon black (Thermax N-990 available from Cancarb Co., Ltd.) as a filler were mixed in a weight ratio of 100/2/20, and the mixture was kneaded with an open roll to give a crosslinkable fluorine-containing rubber composition.

After the fluorine-containing rubber composition was subjected to pressing at 180° C. for 10 minutes for crosslinking, further a two-staged crosslinking in an oven was carried out under the conditions mentioned in Table 4. Thus a 2 mm thick crosslinked product and a sample O-ring (AS-568A-214) were produced. The results of measurements of the crosslinked product with respect to crosslinkability, physical properties in ordinary state and compression set are shown in Table 4.

EXAMPLE 3

A crosslinkable fluorine-containing rubber composition was prepared in the same manner as in Example 2 except that a bisdiaminophenyl compound represented by the formula:

was used instead of bis(aminophenol) AF as a crosslinking agent. A crosslinking was carried out under the conditions mentioned in Table 4 (the same conditions as in Example 1). Crosslinkability, physical properties in ordinary state and compression set of the obtained crosslinked product were measured in the same manner as in Example 1. The results are shown in Table 4.

EXAMPLE 4

(Triazine Crosslinking System)

A crosslinked product was produced under the conditions shown in Table 4 in the same manner as in Example 1 except that 3 parts by weight of tetraphenyltin was blended as a crosslinking agent instead of bis(aminophenol) AF and 10 parts by weight of SRF carbon black was blended based on 100 parts by weight of the nitrile group-containing elastomer having carboxyl group at an end thereof and obtained in Example 1. Crosslinkability and each physical property of the crosslinked product were measured in the same manner as in Example 1. The results are shown in Table 4.

TABLE 4

|  | Example 1 | Example 2 | Example 3 | Example 4 |
| --- | --- | --- | --- | --- |
| Components |  |  |  |  |
| CN-containing polymer | 100 | — | — | 100 |
| COOH-containing polymer | — | 100 | 100 | — |
| Tetraphenyltin | — | — | — | 3 |
| Bis(aminophenyl) AF | 2 | 2 | — | — |
| Tetraamine | — | — | 2 | — |
| MT carbon | 20 | 20 | 20 | — |
| SRF carbon | — | — | — | 10 |
| Vulcanizability | 180° C. | 210° C. | 180° C. | 200° C. |
| v min (kgf) | 0.8 | 0.2 | 0.5 | 0.4 |
| v max (kgf) | 4.2 | 1.6 | 3.0 | 2.7 |
| T10 (min) | 2.4 | 1.7 | 1.6 | 0.3 |
| T90 (min) | 6.6 | 16.5 | 14.5 | 19.0 |

TABLE 4-continued

|  | Example 1 | Example 2 | Example 3 | Example 4 |
|---|---|---|---|---|
| Vulcanization conditions |  |  |  |  |
| Press vulcanization | 180° C. × 10 min | 218° C. × 20 min | 180° C. × 10 min | 180° C. × 10 min |
| Oven vulcanization | 200° C. × 18 h + 288° C. × 18 h | 204° C. × 18 h + 288° C. × 18 h | 200° C. × 18 h + 288° C. × 18 h | 204° C. × 18 h + 288° C. × 18 h |
| Physical properties in ordinary state |  |  |  |  |
| 100% modulus MPa (kgf/cm$^2$) | 11.3 (115) | 5.8 (59) | 13.5 (138) | 6.4 (65) |
| Tensile strength MPa (kgf/cm$^2$) | 21.5 (219) | 18.3 (187) | 19.1 (195) | 13.5 (138) |
| Elongation (%) | 150 | 201 | 130 | 140 |
| Hardness (JIS A) | 75 | 72.9 | 82 | 70 |
| Compression set (%) |  |  |  |  |
| 200° C. × 70 h | 6 | 37 | 12 | 19 |
| 200° C. × 168 h | 9 | — | — | 24 |
| 230° C. × 70 h | 7 | 45 | 12 | — |
| 230° C. × 168 h | 10 | — | — | — |

As shown in Table 4, a crosslinked product being excellent in physical properties in ordinary state and compression set can be obtained at a low crosslinking temperature from the nitrile group-containing polymer having carboxyl group at an end thereof (Example 1), and also a crosslinked product being excellent in physical properties in ordinary state can be obtained from the carboxyl group-containing polymer by oxazole crosslinking (Example 2). Also in case of imidazole crosslinking of the carboxyl group-containing polymer, particularly a crosslinked product having improved compression set at a low crosslinking temperature (180° C.) is obtained (Example 3). Further even if the nitrile group-containing polymer having carboxyl group at an end thereof is crosslinked with tetraphenyltin (Example 4), a minimum viscosity at crosslinking is low and good processability is exhibited.

INDUSTRIAL APPLICABILITY

According to the present invention, a novel fluorine-containing elastomer to which a new crosslinking system can be applied can be obtained, and by crosslinking the elastomer, a mechanical strength and compression set, particularly compression set at high temperature can be enhanced greatly.

What is claimed is:

1. A fluorine-containing rubber composition for crosslinking which comprises a fluorine-containing elastomer having carboxylic acid group and/or alkoxycarbonyl group at both ends of a trunk chain thereof as a crosslinkable group and a crosslinking agent which reacts with carboxylic acid group and/or alkoxycarbonyl group at an end of a trunk chain and/or branched chain of the fluorine-containing elastomer to form an oxazole crosslinking structure, an imidazoic crosslinking structure or a thiazole crosslinking structure.

2. The fluorine-containing rubber composition for crosslinking of claim 1, which comprises 100 parts of the fluorine-containing elastomer and 0.5 to 5.0 parts by weight of the crosslinking agent, and the crosslinking agent is represented by the formula (III):

wherein one of $R^1$ and $R^2$ is —NH$_2$ and another one is —NH$_2$, —OH or —SH, $R^3$ is —SO$_2$—, —O—, —CO—, an alkylene group having 1 to 6 carbon atoms, a perfluoroalkylene group having 1 to 10 carbon atoms or a single bond.

3. The fluorine-containing rubber composition for crosslinking of claim 2, wherein a bisaminophenyl crosslinking agent of the formula (III), in which each of $R^1$ and $R^2$ is —NH$_2$, is used.

4. The fluorine-containing rubber composition for crosslinking of claim 1, wherein the fluorine-containing elastomer is represented by the formula (Ia):

$$X^1\text{-}[A\text{-}(Y)_p]_q\text{-}X^2 \quad (Ia)$$

or the formula (IIa):

$$X^1\text{-}[A\text{-}(Y^1)_p]_q\text{-}[B\text{-}(Y^2_r]_s X^2 \quad (IIa)$$

wherein $X^1$ and $X^2$ are the same or different and each is a carboxylic acid group or an alkoxycarbonyl group, Y, $Y^1$ and $Y^2$ are the same or different and each is a divalent organic group having a carboxylic acid group, an alkoxycarbonyl group, an iodine atom, a bromine atom or a nitrile group at a side chain thereof, A is an elastomeric fluorine-containing polymer chain segment, B is a non-elastomeric fluorine-containing polymer chain segment, p is 0 or an integer of 1 to 10, q is an integer of 1 to 5, r is 0 or an integer of 1 to 10, s is an integer of 1 to 3, any one of $X^1$ and $X^2$ is carboxylic acid group, Y, $Y^1$ and $Y^2$ is optionally contained at random in the segment A or B.

5. The fluorine-containing rubber composition for crosslinking of claim 4, wherein the elastomeric fluorine-containing polymer chain segment comprises not less than 90% by mole of perhalo olefin unit as a component unit.

6. The fluorine-containing rubber composition of claim 4, wherein the fluorine-containing elastomer satisfies the following equation (1):

$$(Sco/Scf) \times (D/2.03) \times (F/71.6) \geq 0.01 \quad (1)$$

wherein Sco, Set D and F represent the following respective values;

Sco: Total area of absorbances at the absorptions derived from carbonyl group of associated and non-associated carboxylic acid groups having the absorption peaks at from 1,680 to 1,830 cm$^{-1}$ when measurement is made with FT-IR with respect to the elastomer to be measured;

Scf: Area of absorbance at absorption derived from a harmonic sound of C—F bond having an absorption peak at from 2,220 to 2,840 cm$^{-1}$ when measurement is made with FT-IR with respect to the elastomer to be measured, and in the case where nitrile group is present, Scf is a value obtained by subtracting an area of absorbance at absorption derived from nitrile group having an absorption peak at from 2,220 to 2,300 cm$^{-1}$ from a total area of absorbances at whole absorption having a peak at from 2,220 to 2,840 cm$^{-1}$;

D: Specific gravity of the aimed elastomer at 20° C.; and

F: Fluorine content (% by weight) of the elastomer to be measured obtained by elemental analysis.

7. A crosslinked fluorine-containing rubber molded article obtained by crosslinking the fluorine-containing rubber composition for crosslinking of claim 1.

8. The fluorine-containing rubber composition for crosslinking of claim 1, wherein the fluorine-containing elastomer has carboxyl group and/or alkoxycarbonyl group at both ends of a trunk chain as a crosslinkable group and is represented by the formula (I):

$X^1$-[A-(Y)$_p$]$_q$-$X^2$     (I)

or the formula (II):

$X^1$-[A-(Y$^1$)$_p$]$_q$-[B-(Y$^2$)$_r$]$_s$X$^2$     (II)

wherein $X^1$ and $X^2$ are the same or different and each is a carboxyl group or an alkoxycarbonyl group, Y, $Y^1$ and $Y^2$ are the same or different and each is a divalent organic group having a carboxylic acid group, alkoxycarbonyl group, iodine atom, bromine atom or nitrile group at a side chain thereof, A is an elastomeric fluorine-containing polymer chain segment, B is a non-elastomeric fluorine-containing polymer chain segment, p is 0 or an integer of 1 to 10, q is an integer of 1 to 5, r is 0 or an integer of 1 to 10, s is an integer of 1 to 3 and, Y, $Y^1$ and $Y^2$ may be contained at random in the segment A or B.

9. The fluorine-containing rubber composition for crosslinking of claim 8, wherein the elastomeric fluorine-containing polymer chain segment comprises not less than 90% by mole of perhalo olefin unit as a component unit.

10. The fluorine-containing rubber composition for crosslinking of claim 8, wherein the elastomeric fluorine-containing polymer chain segment comprises not less than 90% by mole of perhalo olefin unit as a component unit.

11. The fluorine-containing rubber composition of claim 8, wherein the fluorine-containing elastomer satisfies the following equation (1):

(Sco/Scf)×(D/2.03)×(F/71.6)≧0.01     (1)

wherein Sco, Scf, D and F represent the following respective values;

Sco: Total area of absorbances at the absorptions derived from carbonyl group of associated and non-associated carboxylic acid groups having the absorption peaks at from 1,680 to 1,830 cm$^{-1}$ when measurement is made with FT-IR with respect to the elastomer to be measured;

Scf: Area of absorbance at absorption derived from a harmonic sound of C—F bond having an absorption peak at from 2,220 to 2,840 cm$^{-1}$ when measurement is made with FT-IR with respect to the elastomer to be measured, and in the case where nitrile group is present, Scf is a value obtained by subtracting an area of absorbance at absorption derived from nitrile group having an absorption peak at from 2,220 to 2,300 cm$^{-1}$ from a total area of absorbances at whole absorption having a peak at from 2,220 to 2,840 cm$^{-1}$;

D: Specific gravity of the aimed elastomer at 20° C.; and

F: Fluorine content (% by weight) of the elastomer to be measured obtained by elemental analysis.

12. A fluorine-containing rubber composition for crosslinking which comprises a fluorine-containing elastomer having carboxylic acid group and/or alkoxycarbonyl group at both ends of a trunk chain thereof as a cross linkable group and a crosslinking agent which reacts with carboxylic acid group and/or alkoxycarbonyl group at an end of a trunk chain and/or branched chain of the fluorine-containing elastomer to form an oxazole crosslinking structure, an imidazole crosslinking structure or a thiazoic crosslinking structure, wherein said crosslinking agent being at least one selected from the group consisting of a bisdiaminophenyl crosslinking agent represented by the formula (III):

wherein $R^3$ is —SO$_2$—, —O—, —CO—, an alkylene group having 1 to 6 carbon atoms, a perfluoroalkylene group having 1 to 10 carbon atoms or a single bond, one of $R^1$ and $R^2$ is NH$_2$ and another one is —NH$_2$, —OH or —SH, a bisaminophenol crosslinking agent, a bisaminothiophenol crosslinking agent, a bisamidrazone crosslinking agent represented by the formula (IV):

[wherein $R^3$ is as defined above, $R^6$ is a bisamidoxime crosslinking agent represented by the formula (V):

wherein $R_f^3$ is a perfluoroalkylene group having 1 to 10 carbon atoms, and a bisamidoxime crosslinking agent represented by the formula (VI):

wherein n is an integer or 1 to 10.

13. The fluorine-containing rubber composition for crosslinking of claim 12, wherein a bisaminophenyl crosslinking agent of the formula (III), in which each of $R^1$ and $R^2$ is —$NH_2$, is used.

14. The fluorine-containing rubber composition for crosslinking of claim 12, wherein the fluorine-containing elastomer is represented by the formula (Ia):

(Ia)

or the formula (IIa):

(IIa)

wherein $X^1$ and $X^2$ are the same or different and each is a carboxylic acid group or an alkoxycarbonyl group, Y, $Y^1$ and $Y^2$ are the same or different and each is a divalent organic group having a carboxylic acid group, an alkoxycarbonyl group, an iodine atom, a bromine atom or a nitrile group at a side chain thereof, A is an elastomeric fluorine-containing polymer chain segment, B is a non-elastomeric fluorine-containing polymer chain segment, p is 0 or an integer of 1 to 10, q is an integer of 1 to 5, r is 0 or an integer of 1 to 10, s is an integer of 1 to 3, any one of $X^1$ and $X^2$ is carboxylic acid group, Y, $Y^1$ and $Y^2$ is optionally contained at random in the segment A or B.

15. The fluorine-containing rubber composition for crosslinking of claim 14, wherein the elastomeric fluorine-containing polymer chain segment comprises not less than 90% by mole of perhalo olefin unit as a component unit.

16. The fluorine-containing rubber composition of claim 14, wherein the fluorine-containing elastomer satisfies the following equation (1):

$$(Sco/Scf) \times (D/2.03) \times (F/71.6) \geq 0.01 \quad (1)$$

wherein Sco, Scf, D and F represent the following respective values;

Sco: Total area of absorbances at the absorptions derived from carbonyl group of associated and non-associated carboxylic acid groups having the absorption peaks at from 1,680 to 1,830 cm$^{-1}$ when measurement is made with FT-IR with respect to the elastomer to be measured;

Scf: Area of absorbance at absorption derived from a harmonic sound of C—F bond having an absorption peak at from 2,220 to 2,840 cm$^{-1}$ when measurement is made with FT-IR with respect to the elastomer to be measured, and in the case where nitrile group is present, Scf is a value obtained by subtracting an area of absorbance at absorption derived from nitrile group having an absorption peak at from 2,220 to 2,300 cm$^{-1}$ from a total area of absorbances at whole absorption having a peak at from 2,220 to 2,840 cm$^{-1}$;

D: Specific gravity of the aimed elastomer at 20° C.; and

F: Fluorine content (% by weight) of the elastomer to be measured obtained by elemental analysis.

17. The fluorine-containing rubber composition for crosslinking of claim 12, wherein the fluorine-containing elastomer has carboxyl group and/or alkoxycarbonyl group at both ends of a trunk chain thereof as a crosslinkable group and is represented by the formula (I):

(I)

or the formula (II):

(II)

wherein $X^1$ and $X^2$ are the same or different and each is a carboxyl group or an alkoxycarbonyl group, Y, $Y^1$ and $Y^2$ are the same or different and each is a divalent organic group having carboxyl group, alkoxycarbonyl group, iodine atom, bromine atom or nitrile group at a side chain thereof, A is an elastomeric fluorine-containing polymer chain segment, B is a non-elastomeric fluorine-containing polymer chain segment, p is 0 or an integer of 1 to 10, q is an integer of 1 to 5, r is 0 or an integer of 1 to 10, s is an integer of 1 to 3, and Y, $Y^1$ and $Y^2$ may be contained at random in the segment A or B.

18. The fluorine-containing rubber composition for crosslinking of claim 17, wherein the elastomeric fluorine-containing polymer chain segment comprises not less than 90% by mole of perhalo olefin unit as a component unit.

19. The fluorine-containing rubber composition for crosslinking of claim 17, wherein the elastomeric fluorine-containing polymer chain segment comprises not less than 90% by mole of perhalo olefin unit as a component unit.

20. The fluorine-containing rubber composition of claim 17, wherein the fluorine-containing elastomer satisfies the following equation (1):

$$(Sco/Scf) \times (D/2.03) \times (F/71.6) \geq 0.01 \quad (1)$$

wherein Sco, Scf, D and F represent the following respective values;

Sco: Total area of absorbances at the absorptions derived from carbonyl group of associated and non-associated carboxylic acid groups having the absorption peaks at from 1,680 to 1,830 cm$^{-1}$ when measurement is made with FT-IR with respect to the elastomer to be measured;

Scf: Area of absorbance at absorption derived from a harmonic sound of C—F bond having an absorption peak at from 2,220 to 2,840 cm$^{-1}$ when measurement is made with FT-IR with respect to the elastomer to be measured, and in the case where nitrile group is present, Scf is a value obtained by subtracting an area of absorbance at absorption derived from nitrile group having an absorption peak at from 2,220 to 2,300 cm$^{-1}$ from a total area of absorbances at whole absorption having a peak at from 2,220 to 2,840 cm$^{-1}$;

D: Specific gravity of the aimed elastomer at 20° C.; and

F: Fluorine content (% by weight) of the elastomer to be measured obtained by elemental analysis.

* * * * *